Patented Oct. 16, 1923.

1,471,201

UNITED STATES PATENT OFFICE.

PAUL W. PRUTZMAN AND CARL J. von BIBRA, OF LOS ANGELES, CALIFORNIA, ASSIGNORS TO GENERAL PETROLEUM CORPORATION, OF LOS ANGELES, CALIFORNIA, A CORPORATION OF CALIFORNIA.

METHOD OF PRODUCING AND MATERIAL FOR THE TREATMENT OF OILS.

No Drawing. Application filed September 2, 1922. Serial No. 586,041.

*To all whom it may concern:*

Be it known that PAUL W. PRUTZMAN and CARL J. VON BIBRA, citizens of the United States, residing at Los Angeles, in the county of Los Angeles and State of California, have invented certain new and useful Improvements in Methods of Producing and Materials for the Treatment of Oils, of which the following is a specification.

The hereinafter described invention relates to the production of a clarifying and neutralizing material for the treatment of oils generally, although more particularly designed for the treatment of petroleum lubricating oils. The generally accepted material for use as a decolorizing and purifying medium for oils to be treated for color is fuller's earth and while the use of said material is contemplated under our invention, we prefer to utilize minerals of the Montmorillonite type and by which is meant, any and all clays, earth or other mineral substances which when treated with acid and freed of reaction products yield a material capable of decolorizing and purifying oils and by minerals of the Montmorillonite type we have more specific reference to that clay locally known as otaylite, which is found underlying an otay mesa in San Diego County, California. Heretofore, in the use of a neutralizing mineral earth for the decolorization and purification of oils it has been found necessary to subject the same to a pressing treatment and to grind or reduce the material to a finely crushed condition and to utilize the same in a dry condition after the material has been exposed to the atmosphere for a considerable period of time. During the exposure to the atmosphere the mineral absorbs gases to a greater or less extent and in fact, each particle of the material carries entrained or occluded air. If, during the treatment of the oil with the mineral earth intermixed therewith, the temperature be permitted to exceed 250° of heat, there are released the entrained or occluded gases, which have a deteriorating effect upon the oil.

We have found from practical experimentation that if non-spent mineral earth be placed in a plastic or mudded condition through the action of water and then subjected to an acid treatment, preferably sulphuric acid, the water settled therefrom and the material while in a plastic or mudded form introduced into the oil while excluded from the action of the air, we obtain not only a better color and purification of the oil, but expedite the treatment thereof and do so through the use of a smaller quantity of mineral earth than is possible where the material is placed in a dry powdered form after exposure to the atmosphere. Our invention therefore resides in the utilization of the decolorizing mineral agent while in a plastic or mudded form.

Usually the mineral earth employed as a decolorizing and purifying agent for oils has been produced by the treating of the mineral with an acid preferably sulphuric while in a plastic state, washing the resultant mixture with water to substantially free the same from acid and reaction products, draining or filtering the washed material to free it from its water constituents, drying the material at an elevated temperature while exposed to or in contact with the air or other gases and finally grinding it to a fine powder. This is an expensive operation resorted to for placing the mineral earth in condition for use as decolorizing and purifying agent for the oils and even when so treated when intermixed with the oil, the oil is not brought into intimate contact with the entire surface or portions of the mineral material, in fact, there is a decided loss in effectiveness suffered by the use of such treated mineral material due to the fact by the exposure of the same to the air upon the removal of the wash water therefrom and which loss is occasioned unquestionably by the adsorption thereby of gases and impurities present in the air and this loss in effectiveness is approximately one-half of the effectiveness of the material or in other words, it is required that approximately double the quantity of the dry mineral earth when employed under such treatment be utilized to produce the necessary or desired decolorization and purification of the oil over that which we have found required or necessary under our invention. Owing to the expense of the mineral earth decolorizing and purifying agent it is a desideratum that as small a quantity be utilized as is possible to produce the desired result. We have found that by placing the mineral earth containig neutralizing properties in the form of a mud or plastic mass by subjecting the material to an acid treatment and the washing out of the acid through water and drawing off the surplus water, that such plastic body when incorporated or intermixed with the oil and delivered thereto maintained out of exposure to the atmosphere permits of the oil which is to be decolorized and neutralized or purified to come in intimate contact with the solid particles of the mud or plastic mass as the water is evaporated though the heat temperature of the oil from around them and from the interior pores with which each particle of the mineral earth is, or at least believed to be, honeycombed. By the use of the mineral earth placed in the plastic form and intermixed with the oil, the full effect of the material is expended on the oil and all other substances are excluded, so that by the use of say one-half a ton of the mineral earth placed in the plastic or mudded form as we have described and incorporated or intermixed with the oil while excluded from exposure to the atmosphere we are enabled to treat successfully for purification that quantity of oil which heretofore has required in the treatment thereof the presence of one ton of mineral earth, thereby reducing the expense of the treatment so far as the cost of the mineral earth agent is concerned, to substantially one-half. Furthermore, as the oil acts more readily with the mineral earth purifying agent when introduced therewith in plastic form maintained out of contact with the atmosphere, the cost incident to the treatment itself is reduced to a minimum. Inasmuch as the neutralizing and purifying material has the effect when placed in the plastic condition and introduced for intermixing with the oil while excluded from the atmosphere of removing acids from the oil, it is not required that an alkali be employed for the purpose of neutralizing the acid treated oil.

As above stated, any mineral earth whose solid constituent has decolorizing and purifying powers may be employed in the carrying out of our invention when the said mud or plastic mass is dehydrated while in contact with the oil to be treated.

Having thus described our invention, what we claim as new and desire to protect by Letters Patent of the United States, is:—

1. The method of producing a decolorizing and purifying agent for oils, which consists in first forming a mudded mass from non-spent mineral earth, then subjecting the said mudded mass to the action of an acid for the separation therefrom of acid soluble bodies, removing the acid and reaction products from the insoluble portion of the said mass by the application of water, thickening the mass by the withdrawal of excess wash water therefrom and maintaining the said treated body until used in a mudded condition to prevent contact of air with the solid particles thereof.

2. The method of producing a plastic body for the intermixture with oils to be treated for the decolorization and purification thereof, which consists in forming a mudded mass from non-spent mineral earth of the Montmorillonite type, subjecting the mass so formed to the action of an acid for the removal of certain acid soluble bodies therefrom, washing the acid and reaction products from the insoluble portion of the mass by the application of water thereto, withdrawing excess water therefrom and maintaining the treated earth in a mudded condition for intermixture with the oil to be treated without an exposure of the solid particles thereof to the atmosphere.

3. The method of producing a decolorizing agent for oils, which resides in first forming a mudded mass of non-spent mineral earth, treating the mass so formed with acid for the removal of acid soluble bodies therefrom, washing out most of the acid and reaction products from the mudded mineral earth, reducing the washed mass to a thick plastic condition or mud adapted to have the remaining water evaporated therefrom when incorporated with oil raised to a temperature above that of the boiling point of water, and maintaining the treated earth in its mudded condition until utilized for intermixture with the oil to be treated.

4. A decolorizing agent for oils, the same comprising a plastic mass or mud of non-spent mineral earth, from which acid soluble bodies have been removed and the acid and reaction products washed therefrom and excess moisture removed and maintained in a plastic or mudded condition for intermixture with the oil to be treated without an exposure of the solid particles thereof to the atmosphere.

5. An oil decolorizing agent, the same comprising a mudded mass of non-spent mineral earth freed of acid soluble bodies and of acid and acid reaction products.

In testimony whereof we have signed our names to this specification.

PAUL W. PRUTZMAN.
CARL J. von BIBRA.